United States Patent
Holder et al.

(10) Patent No.: US 6,781,249 B2
(45) Date of Patent: Aug. 24, 2004

(54) RETROFITTABLE POWER SUPPLY

(75) Inventors: Helen Ann Holder, Sunnyvale, CA (US); Sandra Goebel, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 211 days.

(21) Appl. No.: 09/941,268

(22) Filed: Aug. 29, 2001

(65) Prior Publication Data

US 2003/0042740 A1 Mar. 6, 2003

(51) Int. Cl.$^7$ ................................................ H02P 9/04
(52) U.S. Cl. ...................................... 290/1 A; 290/1 R
(58) Field of Search ................................ 290/1 R, 1 A; 173/217, 1; 30/500; 307/64, 66; 429/96, 98, 90, 247, 179; 320/103; 361/686; 364/200

(56) References Cited

U.S. PATENT DOCUMENTS

| | | | | |
|---|---|---|---|---|
| 3,134,697 A | | 5/1964 | Niedrach ..................... 136/86 |
| 4,876,115 A | | 10/1989 | Raistrick ..................... 427/115 |
| 5,193,050 A | * | 3/1993 | Dimmick et al. ............ 361/687 |
| 5,254,929 A | * | 10/1993 | Yang ........................... 320/103 |
| 5,409,784 A | * | 4/1995 | Bromberg et al. .......... 180/65.3 |
| 5,482,792 A | | 1/1996 | Faita et al. .................... 429/30 |
| 5,535,371 A | * | 7/1996 | Stewart et al. ................ 703/25 |
| 5,563,782 A | * | 10/1996 | Chen et al. ................. 363/146 |
| 5,654,113 A | * | 8/1997 | Vaidyanathan et al. .... 252/62.2 |
| 5,693,201 A | * | 12/1997 | Hsu et al. .................... 204/241 |
| 5,731,683 A | * | 3/1998 | Nakanishi .................... 320/111 |
| 5,759,712 A | | 6/1998 | Hockaday .................... 429/30 |
| 5,805,412 A | * | 9/1998 | Yanagisawa et al. ....... 361/686 |
| 5,811,201 A | * | 9/1998 | Skowronski ................. 204/269 |
| 5,847,545 A | * | 12/1998 | Chen et al. .................... 307/18 |
| 5,901,056 A | * | 5/1999 | Hung ........................... 307/64 |
| 5,969,965 A | * | 10/1999 | Byrne et al. ................. 363/144 |
| 5,998,058 A | * | 12/1999 | Fredley ........................ 204/296 |
| 6,022,634 A | | 2/2000 | Ramunni et al. ............. 429/34 |
| 6,057,051 A | | 5/2000 | Uchida et al. ................ 429/19 |
| 6,057,608 A | * | 5/2000 | Bailey et al. ................. 307/43 |
| 6,075,345 A | * | 6/2000 | Lee ............................. 320/138 |
| 6,121,695 A | * | 9/2000 | Loh ............................. 307/64 |
| 6,134,612 A | * | 10/2000 | Bailey et al. ................. 710/2 |
| 6,296,065 B1 | * | 10/2001 | Carrier ........................ 173/171 |
| 6,304,058 B2 | * | 10/2001 | Watson et al. .............. 320/114 |
| 6,307,742 B1 | * | 10/2001 | Diaz et al. ................... 292/148 |
| 6,326,764 B1 | * | 12/2001 | Virtudes ...................... 320/101 |
| 6,353,304 B1 | * | 3/2002 | Atcitty et al. ................ 320/116 |
| 2001/0033501 A1 | * | 10/2001 | Nebrigic ...................... 363/49 |

FOREIGN PATENT DOCUMENTS

EP            0788172            8/1997

* cited by examiner

Primary Examiner—Tuan Hguyen
Assistant Examiner—Julio C. Gonzalez

(57) ABSTRACT

A retrofittable power supply allows an electronic device that is initially designed to be non-portable (in the sense that such electronic and electrical devices require a wired connection to an AC or DC power supply) to operate in geographical regions, or under conditions, in which a wired power supply is not available. The retroffitable power supply can simply plug into an existing case or frame of the non-portable electronic device, and can then serve as a means for powering both the non-portable electronic device, as well as a means for powering peripheral devices that may be coupled to the non-portable electronic device.

6 Claims, 4 Drawing Sheets

RETROFITTABLE POWER SUPPLY

TECHNICAL FIELD

The technical field is power supplies for electrical and electronic devices, and in particular, wireless power supplies for powering electronic devices such as personal computers.

BACKGROUND

Many electrical and electronic devices cannot be used in certain geographical regions because of the absence of AC or DC power to operate the devices. Other electronic or electrical devices are restricted geographically because the power supplies in these devices do not conform to the available power in terms of voltage and/or frequency. One solution is to produce portable versions of the electrical and electronic devices that can operate on self-contained power supplies, such as nickel-cadmium batteries or the like. Recently, fuel cell technology has been adapted to provide power for the portable electronic devices. U.S. Pat. No. 6,057,051 discloses a miniaturized fuel cell assembly that can be adapted for use in a portable, or laptop computer. U.S. Pat. No. 5,759,712 discloses a miniature fuel cell that can be adapted to a variety of purposes to power portable electronic devices, such as cellular telephones.

The above-noted patents disclose solutions for powering portable electronic devices. Because they are intended to be portable, the electronic devices must be designed to include specific features, such as light weight, small size, and most importantly, low power consumption. Thus, the design of a portable electronic device necessarily considers the availability of a power supply that can fit the device's design parameters of light weight and small size, and yet can deliver sufficient power to operate the device for a sustained period. Such design constraints (portability, low power consumption) often lead to lower performance capabilities compared to corresponding non-portable devices, and to greatly increased costs of manufacture.

While electrical and electronic devices that are not designed to be portable (including design limits on power consumption) cannot be used in geographical regions where power is unavailable, these non-portable devices also are generally less expensive to manufacture, and provide for better performance than their portable counterparts. For example, a desktop personal computer may operate at a higher clock speed, have a larger memory and mass storage, and cost less, than a laptop, or portable personal computer. Thus, achieving the best performance at the lowest cost is not consistent with the concept of portability.

SUMMARY

A retrofittable power supply allows an electronic device that is initially designed to be non-portable (in the sense that such electronic and electrical devices require a wired connection to an AC or DC power supply) to operate in geographical regions, or under conditions, in which a wired power supply is not available. The retroffitable power supply can simply plug into an existing case or frame of the non-portable electronic device, and can then serve as a means for powering both the non-portable electronic device, as well as a means for powering peripheral devices that may be coupled to the non-portable electronic device.

In an embodiment, the retrofittable power supply comprises a housing having a form factor equivalent to a conventional, wired power supply. The housing includes a power generation section. The power generation section may comprise a fuel cell, or otherwise incorporate advanced fuel cell technology. The power generation section may include, as part of the fuel cell, a water holding and disposal module. The water holding and disposal module may comprise water absorption means, which may include commercially available materials that absorb and hold water generated by the fuel cell. The water holding and disposal module may also include a water tank to hold excess water generated by the fuel cell. The water holding and disposal module may also include means for disposal of excess water. In an embodiment, the water disposal means comprises a fan that accelerates evaporation of the excess water. Alternatively, or in addition, heat generated by operation of the fuel cell may be used to speed evaporation. In another embodiment, excess water may be drained from the water holding and disposal module. Such drainage may be facilitated by a manually or automatically operated valve, and a piping arrangement that diverts the draining water from components of the non-portable electronic device.

The retroffitable power supply may also comprise DC/AC power converter to supply AC power. The AC power may be supplied at one or more AC power out fixtures to enable operation of peripheral devices associated with the non-portable electronic device.

In another embodiment, the retrofittable power supply may include a power storage module. The power storage module may be a rechargeable battery, for example. The power generation module then provides DC power to the power storage module for subsequent delivery to one or more components of the non-portable electronic device or to one or more peripheral devices.

A specific application of the retrofittable power supply is to replace a conventional, wired power supply in a desktop personal computer. The conventional, wired power supply is simply removed, and is replaced by the retrofittable power supply. The AC power out section of the retrofittable power supply provides AC power to peripheral devices such as a monitor and a printer, for example. When using a fuel cell in the power generation module, the fuel source will eventually have to be replenished. This may be accomplished by replacing the entire retrofittable power supply with a new retrofittable power supply. Alternatively, a fuel supply in the fuel cell may simply be renewed. For example, in a fuel cell using liquid methanol carried in a fuel tank, the tank can be refilled or simply replaced.

Other power sources besides fuel cells may be used in the power generation module. For example, the power generation module may use a radioactive material, such as plutonium 239, to generate heat energy, which is then converted into electrical energy. Other possible power generation means can include small turbines or solar devices. Power storage means may include, in addition to conventional batteries, fly wheel storage devices, and devices that convert the heat generated by operation of the fuel cell into electrical power for subsequent storage.

DESCRIPTION OF THE DRAWINGS

The detailed description will refer to the following drawings, in which like numerals refer to like items, and in which.

DETAILED DESCRIPTION

Figure 1:
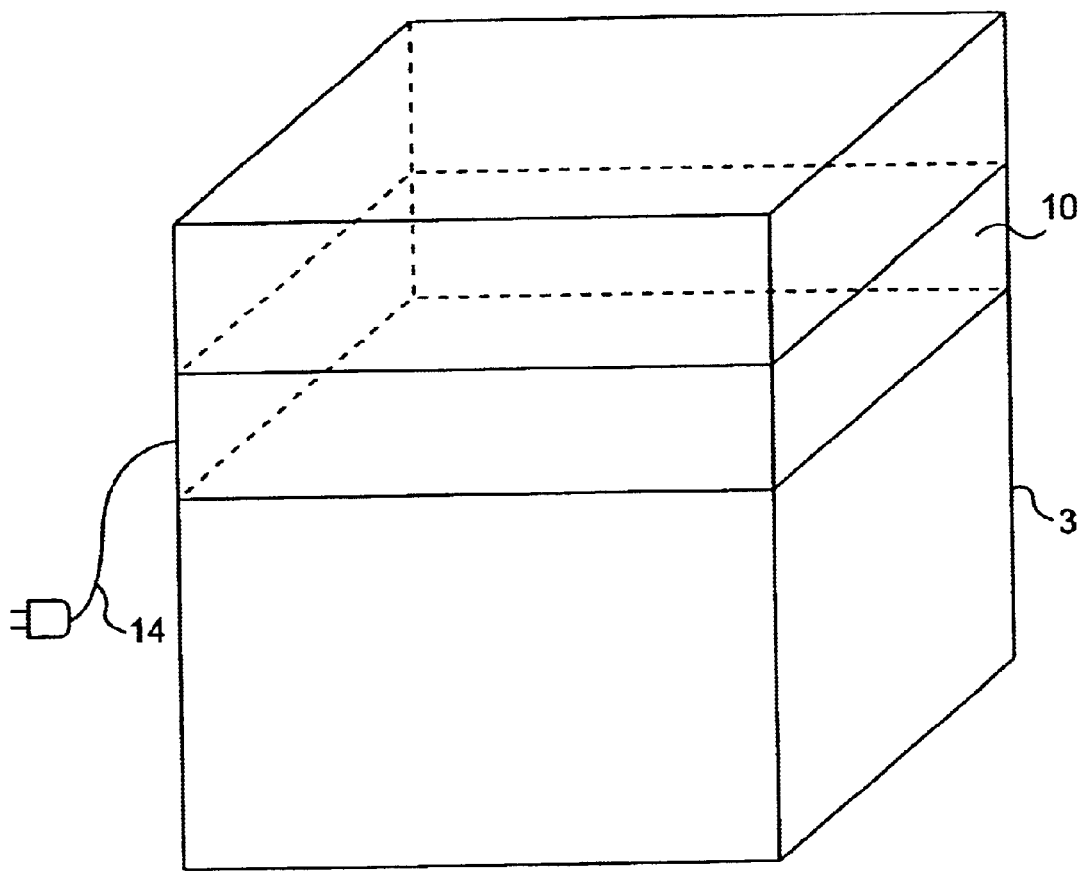
FIG. 1 illustrates a typical non-portable electronic device having a conventional wired power supply.

To provide non-wired power to a non-portable device, a retrofittable power supply uses a same form factor as an existing conventional, wired power supply used in the non-portable device. The non-portable device may be a desktop personal computer, for example. In an embodiment, the retrofittable power supply may use fuel cell technology to generate DC power. Alternative means for developing power include devices or materials that generate heat, which can subsequently be converted to electrical energy. An example of such a heat-generating material is plutonium 239. Other devices for generating electrical power include a solar power device and a wind turbine.

A fuel cell is an electrochemical apparatus wherein chemical energy generated from a combination of a fuel with an oxidant is converted to electric energy in the presence of a catalyst. The fuel is fed to an anode, which has a negative polarity, and the oxidant is fed to a cathode, which, conversely, has a positive polarity. The two electrodes are connected within the fuel cell by an electrolyte to transmit protons from the anode to the cathode. The electrolyte can be an acidic or an alkaline solution, or a solid polymer ion-exchange membrane characterized by a high ionic conductivity. A typical fuel cell uses a solid polymer electrolyte. The solid polymer electrolyte is often referred to as a proton exchange membrane (PEM).

In fuel cells employing liquid fuel, such as methanol, and an oxygen-containing oxidant, such as air or pure oxygen, the methanol is oxidized at an anode catalyst layer to produce protons and carbon dioxide. The protons migrate through the PEM from the anode to the cathode. At a cathode catalyst layer, oxygen reacts with the protons to form water. The anode and cathode reactions in this type of direct methanol fuel cell are shown in the following equations:

Anode reaction: $CH_3OH + H_2O \rightarrow 6H^+ + CO_2 + 6e^-$

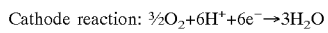

Cathode reaction: $\frac{3}{2}O_2 + 6H^+ + 6e^- \rightarrow 3H_2O$

The essential requirements of typical fuel cells include: first, the fuel cell requires efficient delivery of fuel and air to the electrode, which typically requires complicated microchannels and plumbing structures. A second requirement is that the fuel cell should provide easy access to the catalyst and a large surface area for reaction. This second requirement can be satisfied by using an electrode made of an electrically conductive porous substrate that renders the electrode permeable to fluid reactants and products in the fuel cell. To increase the surface area for reaction, the catalyst can also be filled into or deposited onto a porous substrate. However, these modifications result in a fragile porous electrode that may need additional mechanical support, such as by use of a fiber matrix. Alternatively, the electrode can be made of an etched porous Vycor glass substrate or an etched-nuclear-particle-track membrane substrate to improve its toughness and strength. A third requirement is close contact between the electrode, the catalyst, and the PEM. The interface between the electrode and PEM is a discontinuity area as concerns the electric current transmission wherein the charge carriers are the electrons, on one side, and the protons on the other side. A solution to this problem has been attempted by hot pressing of the electrodes onto the PEM (U.S. Pat. No. 3,134,697). Another solution suggests the intimate contact of the catalytic particles with a protonic conductor before interfacing the electrode with the electrolyte (U.S. Pat. No. 4,876,115). Other solutions are described in U.S. Pat. Nos. 5,482,792 and 6,022,634. A fourth requirement is that the fuel cell should provide for humidity control of the electrode. The PEM requires water to be effective in conducting protons. However, since it operates at a higher temperature than its surroundings, the PEM tends to dehydrate during operation. The typical method of re-hydrating the PEM is to capture water in the exhaust stream and circulate it back to the PEM.

FIG. 1 illustrates a non-portable electronic device 1 including a conventional, wired power supply. The non-portable electronic device 1 illustrated in FIG. 1 is shown as a desktop computer. The non-portable electronic device 1 includes a housing 3 in which components of the personal computer are maintained, and a power supply 10. The power supply 10 includes a device for converting AC power to DC power for subsequent supply to components of the personal computer, means for supplying the AC power to peripheral devices associated with the personal computer, and a cooling fan (not shown) for removing heat generated by the power supply 10. Power is provided to the power supply through transmission means 14, which is a conventional AC power cord.

Figure 2:
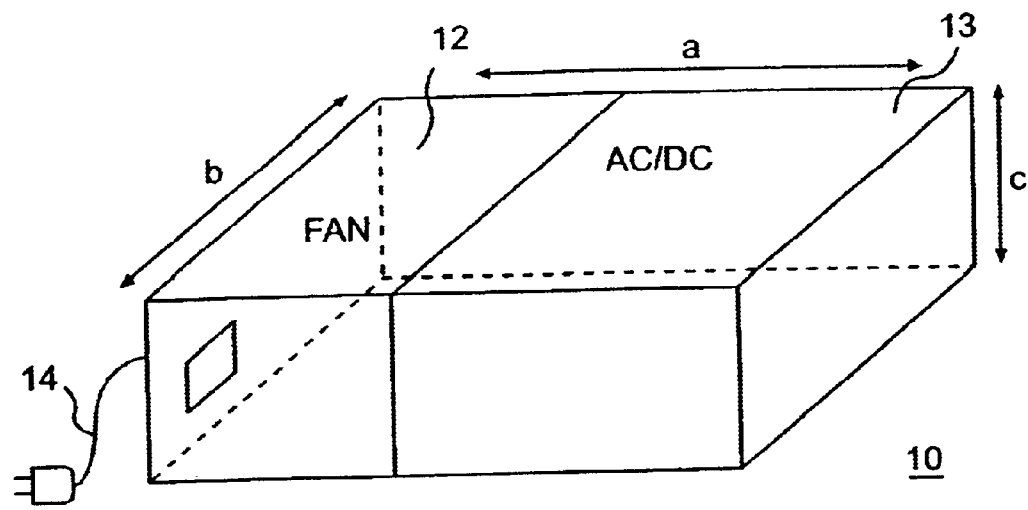
FIG. 2 illustrates the conventional wired power supply from the non-portable electronic device of FIG. 1.

FIG. 2 illustrates the power supply 10 in more detail. The power supply 10 includes the AC/DC conversion module 13, cooling fan section 12 and the power supply cord 14. As shown in FIG. 2, the power supply 10 is built to specific dimensions a, b and c. The dimensions a, b and c may be specified as industry standard values for a typical personal computer. Other industry standards or criteria for the power supply 10 may include input voltage and frequency output voltage, location of electrical connections, power (watts) generated, limits on heat generated, and other criteria/characteristics. In this way, any wired power supply unit may be substituted for the power supply 10 shown in FIG. 2. The dimensions and other criteria that determine the shape and other characteristics of the power supply 10 are here referred to as the form factor of the power supply 10.

A limitation of the non-portable electronic device 1 shown in FIG. 1 is that the device cannot be operated in any area where electrical power is not readily available. Furthermore, the device 1 may be designated or designed to operate with power delivered at a certain frequency or voltage level. The device 1 may not be usable in all geographical regions, particularly those regions that supply electrical power at frequencies and voltages that are not compatible with the power supply 10. Thus, operation of the electronic device 1 may be limited to certain geographical regions, diminishing its value.

Figure 3:
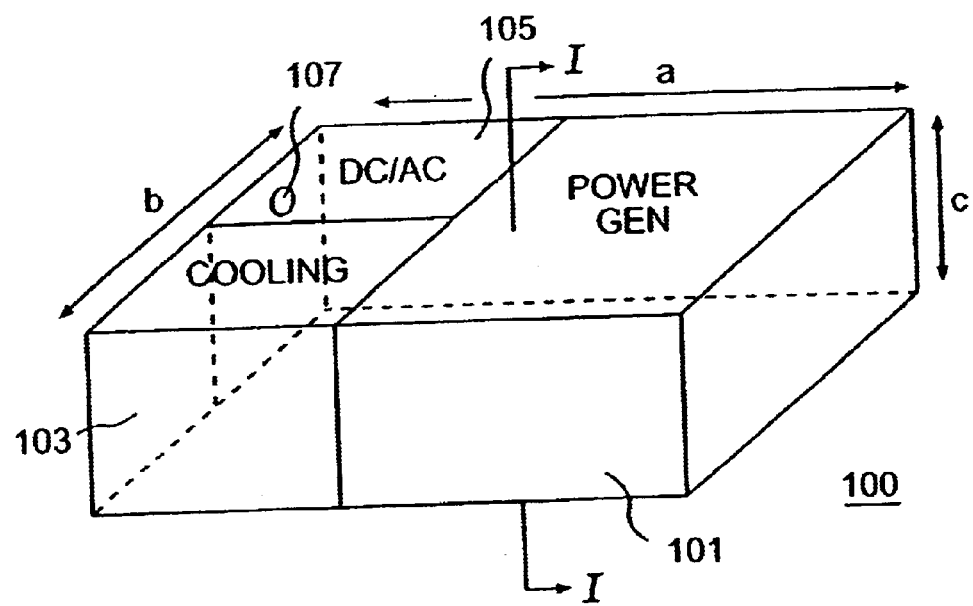
FIG. 3 illustrates a retrofittable power supply adaptable to replace the conventional power supply shown in FIG. 2.

To solve this geographical use limitation and other problems inherent in the power supply 10 shown with the non-portable electronic device 1, a retrofittable power supply 100 having a same form factor as the power supply 10 shown in FIG. 2, is provided as shown in FIG. 3. The retrofittable power supply 100 includes a power generation module 101, a cooling module 103, and a DC/AC generation module 105. Also shown is an AC power out connection 107. As illustrated in FIG. 3, the retrofittable power supply 100 has dimensions a, b and c equal to the corresponding dimensions a, b and c shown for the power supply 10 in FIG. 2. Other characteristics of the retrofittable power supply 10 may be made to coincide with those of the power supply 10. Accordingly, the retrofittable power supply 100 may simply be inserted into the framework or bay normally used to house the power supply 10.

In an embodiment, the power generation module 101 may be a fuel cell, or otherwise incorporate fuel cell technology. The fuel cell may be a proton exchange membrane fuel cell, for example. Excess water generated by the fuel cell may be held or disposed of through the power generation module 101.

The DC/AC conversion module 105 includes means for converting DC power generated by the power generation module 101 into AC power for further supply to components of the non-portable electronic device 1 and as the power supply for peripherals that may be associated with the non-portable electronic device 1, including a computer monitor and a printer, for example.

The cooling module 103 may be used to remove excess or waste heat generated by the power generation module 101. In an embodiment, the cooling module 103 may comprise a cooling fan. Alternatively, the cooling module 103 may be implemented as a series of fins that provide for radiant heat transfer from the power generation module 101. Other conventional means of removing waste heat generated by the power generation module may also be incorporated into the cooling module 103. Finally, the cooling module 103 may return some waste heat to the power generation module 101, for example, to help with evaporation of excess water retained by the power generation module 101.

Figure 4:
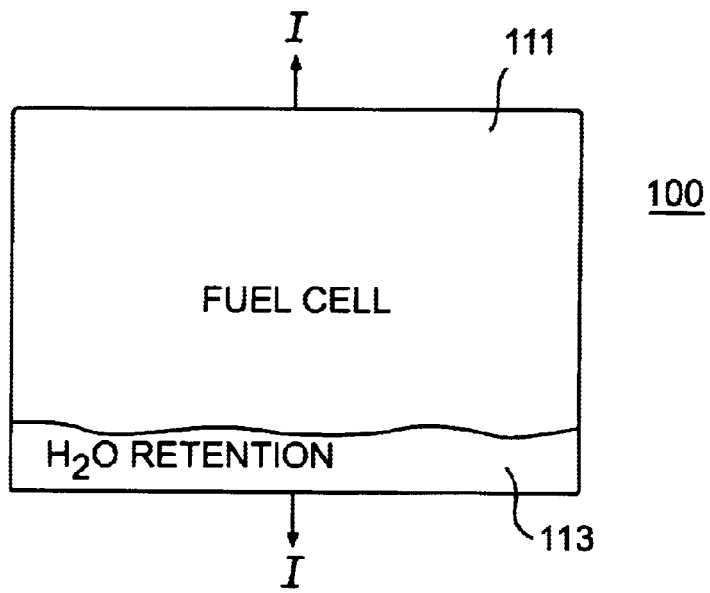
FIG. 4 is a cross sectional view of the retrofittable power supply of FIG. 3.

FIG. 4 is a cross sectional view of the power generation module 100, embodied as a fuel cell. The power generation module 101 includes a fuel cell 111 and a water retention mechanism 113. Water retention and disposal means are described in detail in U.S. Pat. No. 6,057,051, hereby incorporated by reference. The water retention means include super absorbent polymers such as a polyacrylate cross-link material and a starch-polyacrylate graphed copolymer cross-link material. Other water retention means may include a small water tank.

Figure 5:
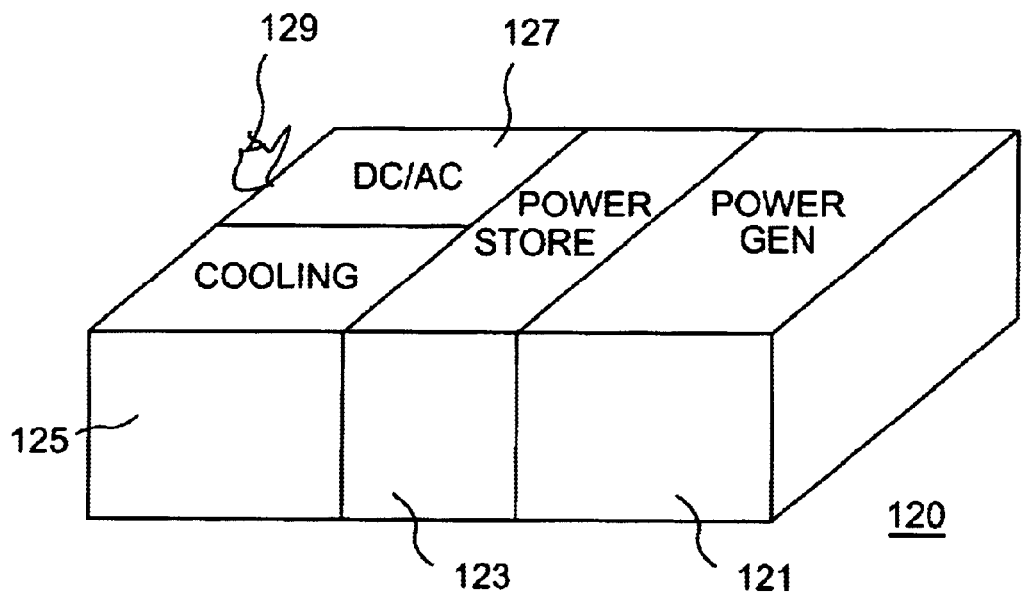
FIG. 5 illustrates an alternative retrofittable power supply adapted for use with the non-portable electronic device of FIG. 1.

FIG. 5 shows an alternative embodiment of a retrofittable power supply 120. The retrofittable power supply 120 includes power generation module 121, power storage module 123, DC-AC conversion module 127, cooling module 125, and AC power out connection 129. The power generation module 121 may be a proton exchange membrane fuel cell, for example. The power generation module 121 may generate DC power that is subsequently stored in the power storage module 123. Alternatively, or in addition, the power generation module 121 may provide DC power directly to components of the non-portable electronic device 1 shown in FIG. 1, and provide, in parallel, power to the power storage module 123. The power storage module 123 may be a conventional rechargeable battery, for example. Other technology such as a fly wheel device may also be used in the power storage module 123. Use of the power storage module 123 may ensure a constant supply of power to the non-portable electronic device 1 during times when the power generation module 121 is not generating electrical power at a sufficient rate to supply the components of the non-portable electronic device 1. The DC/AC conversion module 127 and the cooling module 125 may operate in a manner similar to corresponding devices shown in FIG. 3.

Figure 6:
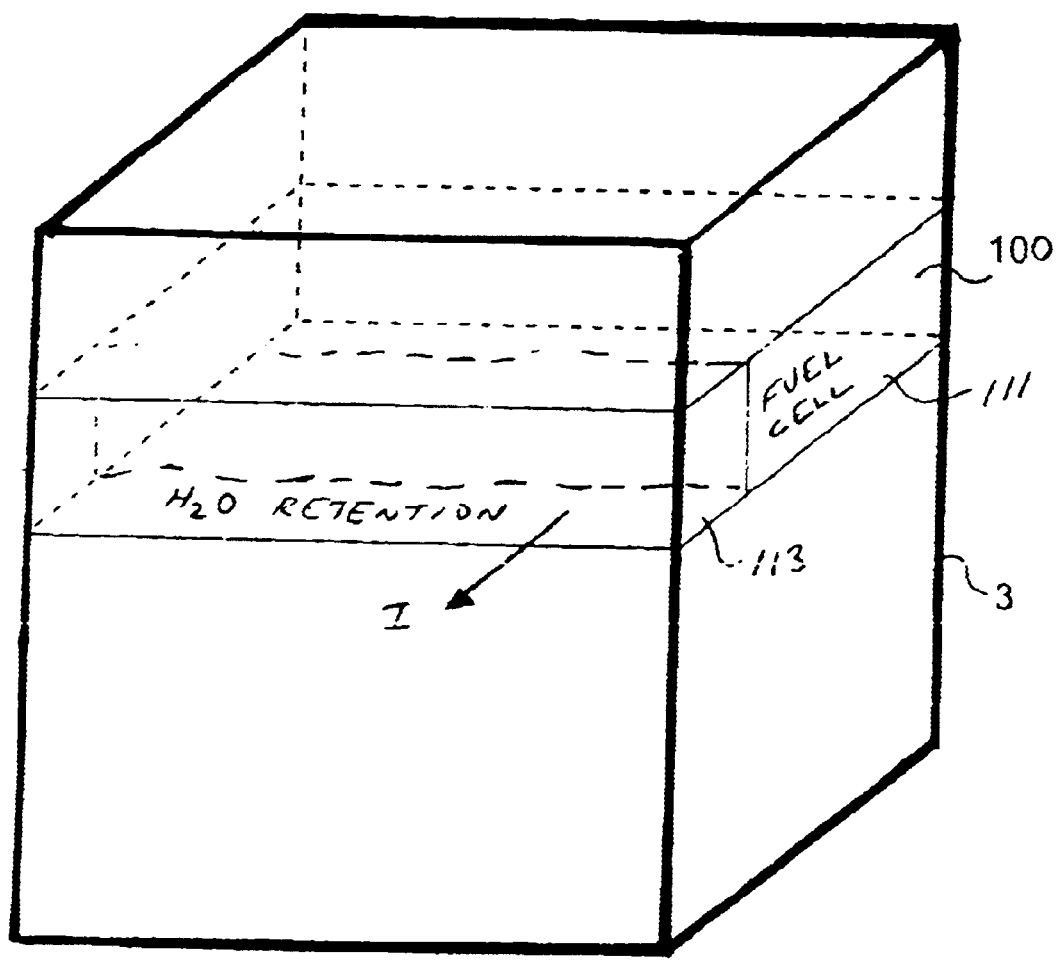
FIG. 6 illustrates an electronic device having a fuel-cell based power supply having the same form factor and dimensions as the conventional wired power supply of FIG. 1 and adapted for retrofittable replacement into the electronic device.

An embodiment of an electronic device 1 having a housing 3 and a fuel cell based power supply 100 with the same form factor as the conventional power supply 10 is illustrated in FIG 6. In this embodiment the power module includes a includes a fuel cell 111 and a water retention mechanism 113 adapted for retrofittable replacement into the electronic device.

In operation, the retrofittable power supply 100, shown in FIG. 3, provides DC and AC power to various components and peripherals associated with the non-portable electronic device 1, shown in FIG. 1. The retrofittable power supply 100 may be replaced when the power generation module 101 is no longer capable of generating electrical power. For example, in a power supply in which fuel cell technology is employed when the fuel available, (e.g., liquid methanol) is exhausted, the fuel cell will not longer be able to generate electrical power, and the retrofittable power supply 100 may be replaced with a replacement retrofittable power supply having a fully charged fuel cell. Alternatively, the power generation module 101 using fuel cell technology may employ a refillable fuel supply. In this embodiment, when the fuel cell is no longer capable of generating electrical power, the retrofittable power supply 100 may be removed from the non-portable electronic device 1, and the refillable fuel supply may be refilled with fuel, such as liquid methanol.

Using the retrofittable power supply 100 or 120, or similar devices, many non-portable electrical and electronic devices may be used in areas that either do not provide electrical power, or provide electrical power at a frequency and/or voltage that is non-compatible with the non-portable electronic or electrical device. This allows low cost, and relatively high performance electronic and electrical devices to be used in situations in which previously, only portable electrical and electronic devices could be used.

What is claimed is:

1. A retrofittable, wireless power supply device, not requiring a wired connection to an external source of electrical power, for powering a personal computer, comprising:

a power generation module housing having a form factor equal to a form factor of a conventional wired power supply device that the retrofittable power supply device is adapted to replace the conventional wired power supply device being adapted to receive electrical power from the external source of electrical power over a wired connection;

a self-contained power generation module disposed within the power generation module housing, the power generation module comprising:

a DC power generator capable of generating DC power for use in an electronic device including for use in the personal computer, the DC power generator comprising a liquid catalytic proton exchange membrane module fuel cell and a water retention mechanism, and a DC/AC converter that generates AC output power using the generated DC power for use in the personal computer or peripheral devices connected with the personal computer; and one or more AC power output connections, wherein the retrofittable wireless power supply device being retrofittably insertable into the framework of the personal computer normally occupied by the conventional wired power supply after removal, does not require a wired connection to an external source of electrical power, and replaces the wired power supply device during operation of the personal computer.

2. A retrofittable power supply not requiring a wired connection to an external source of electrical power for use in a personal computer electronic device, comprising:

means for housing the retrofittable power supply device, the means for housing having a form factor equal to that of a wired power supply device used in the electronic device that the retrofittable power supply device is adapted to replace;

means for generating power for use in the personal computer electronic device, comprising:
   self-contained liquid catalytic proton exchange membrane module fuel cell means for generating DC power and a water retention means, and
   means for converting the generated DC power to AC power for use in the personal computer electronic device or peripheral devices connected with the personal computer electronic device; and means for outputting the AC power;

the retrofittable wireless power supply device being retrofittable insertable into the framework of the personal computer electronic device normally occupied by the conventional wired power supply after removal, does not require a wired connection to an external source of electrical power and replaces the wired power supply device during operation of the personal computer electronic device.

3. A retrofittable, wireless power supply as in claim 1, wherein when the power supply ceases to be able to generate power due to depletion of a fuel for the fuel cell, the retrofittable power supply being either replace with a second replacement retrofittable power supply having a fully charged fuel cell, or being removed from the personal computer, refilled with fuel and then replaced in the personal computer.

4. A retrofittable, wireless power supply as in claim 3, wherein the fuel comprises methanol.

5. A retrofittable, wireless power supply as in claim 2, wherein when the power supply ceases to be able to generate power due to depletion of a fuel for the fuel cell, the retrofittable power supply being either replaced with a second replacement retrofittable power supply having a fully charged fuel cell, or being removed from the personal computer, refilled with fuel and then replaced in the personal computer.

6. A retrofittable, wireless power supply as in claim 5, wherein the fuel comprises methanol.

* * * * *